(12) United States Patent
Berg

(10) Patent No.: US 6,860,521 B2
(45) Date of Patent: Mar. 1, 2005

(54) HOSE COUPLER

(76) Inventor: William H. Berg, 10316 County Rd. Y, Marshfield, WI (US) 54449

( * ) Notice: Subject to any disclaimer, the term of this patent is extended or adjusted under 35 U.S.C. 154(b) by 0 days.

(21) Appl. No.: 10/242,972

(22) Filed: Sep. 13, 2002

(65) Prior Publication Data

US 2003/0047943 A1 Mar. 13, 2003

Related U.S. Application Data

(60) Provisional application No. 60/322,256, filed on Sep. 13, 2001.

(51) Int. Cl.[7] .............................................. F16L 33/00
(52) U.S. Cl. ...................................... 285/255; 285/242
(58) Field of Search ................................. 285/242, 256, 285/239, 241, 255

(56) References Cited

U.S. PATENT DOCUMENTS

| 2,341,003 A | * | 2/1944 | Watson | 285/256 |
|---|---|---|---|---|
| 3,191,975 A | * | 6/1965 | LaMarre et al. | 285/243 |
| 4,229,029 A | * | 10/1980 | Boyer et al. | 285/242 |
| 4,275,769 A | * | 6/1981 | Cooke | 138/109 |
| 4,367,889 A | * | 1/1983 | Redl | 285/256 |
| 4,498,691 A | * | 2/1985 | Cooke | 285/256 |
| 5,176,411 A | | 1/1993 | DuPont, Jr. | |
| 5,240,291 A | | 8/1993 | Zornow | |
| 5,317,799 A | * | 6/1994 | Chapman et al. | 285/256 |

* cited by examiner

Primary Examiner—David Bochna
(74) Attorney, Agent, or Firm—Joseph T. Leone, Esq.; DeWitt Ross & Stevens S.C.

(57) ABSTRACT

A hose coupler that allows flexible hosing to be quickly and easily mated to various pieces of equipment. The hose coupler includes a stem that fits snugly into the end of the hose, a compression sleeve, and a collar that forces the compression sleeve against the hose, thereby reversibly fastening the stem within the end of the hose.

6 Claims, 4 Drawing Sheets

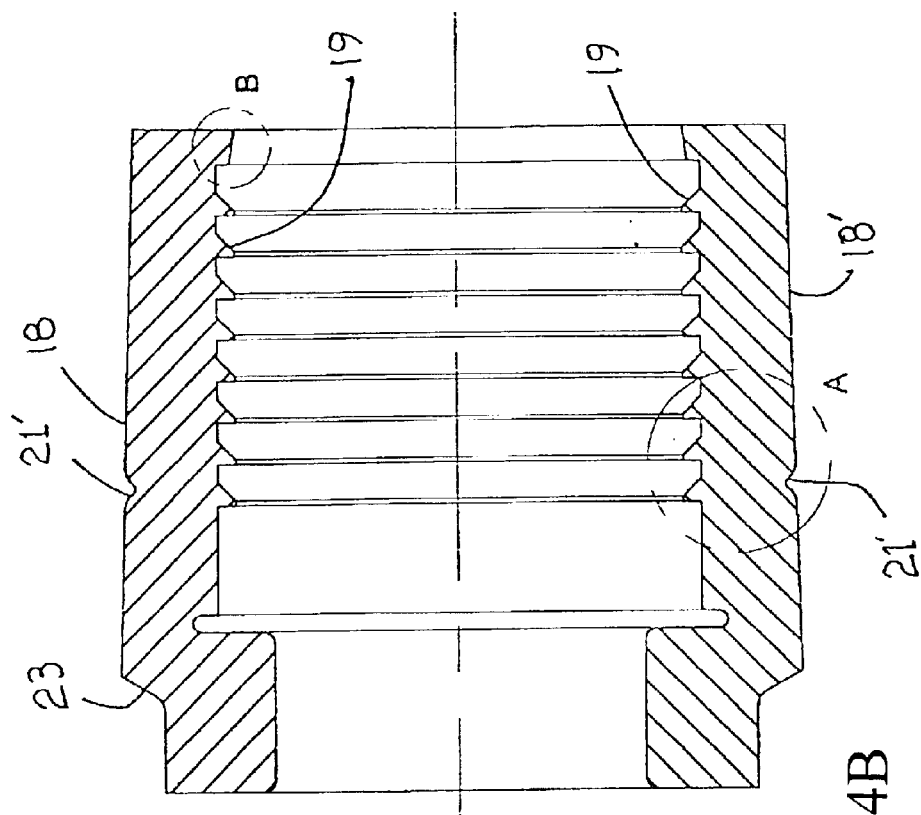
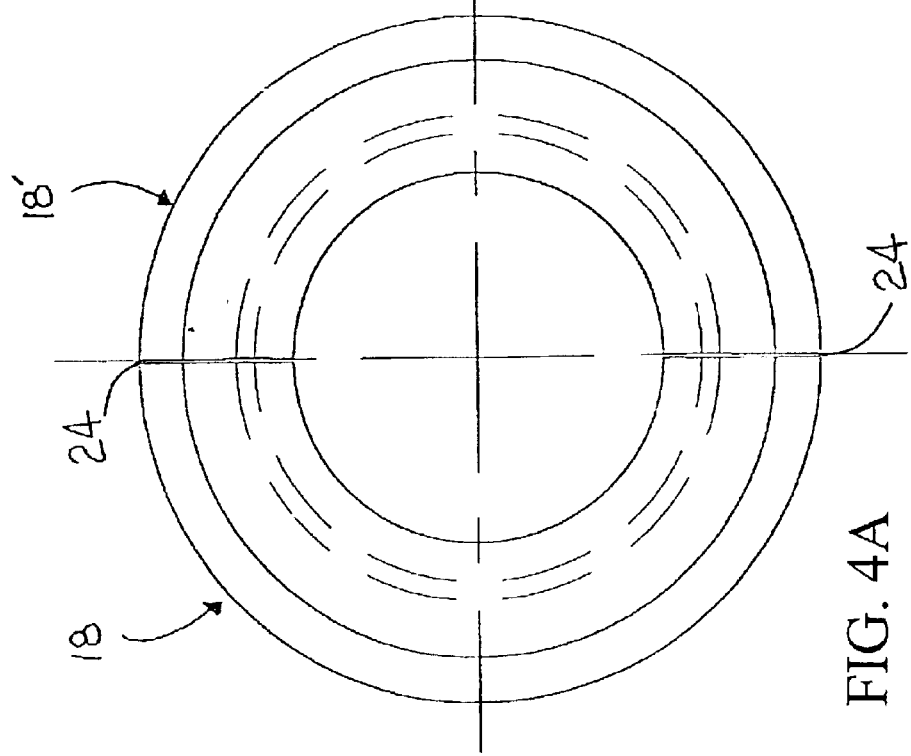
FIG. 4A
FIG. 4B

HOSE COUPLER

CROSS-REFERENCE TO RELATED APPLICATIONS

Priority is hereby claimed under 35 USC §119(e) to provisional patent application Ser. No. 60/322,256, filed Sep. 13, 2001, the content of which is incorporated herein.

FIELD OF THE INVENTION

The invention is directed to a device for coupling flexible hoses to various fittings or to other hoses. In the preferred embodiment, the hose coupler of the present invention is for use in environments where sanitary and/or sterile conditions are required, as in the food processing and pharmaceutical industries.

BACKGROUND

Several types of sanitary hose couplings are known to the art. See, for example, U.S. Pat. No. 5,176,411, issued Jan. 5, 1993 to DuPont, Jr., and U.S. Pat. No. 5,240,291, issued Aug. 31, 1993 to Zornow. These devices, however, generally suffer from one or more undesirable traits. For example, bubbles or wrinkles tend to develop where the flexible hose enters the coupler, or the forces exerted in attaching the coupler to the walls of the flexible hose destroy the integrity of the hose itself Also, these couplers are difficult to assemble and disassemble quickly and easily.

The food processing industry in general, and the dairy industry in particular, is an area where the importance of sanitary working conditions cannot be understated. The equipment required for the production of food products slated for human consumption must been meet strict standards of cleanliness. Meeting these standards often requires labor-intensive maintenance. Equipment must, for example, be thoroughly scrutinized for the presence of minute cracks, tears, and the like, which provide areas where bacteria can grow. Such maintenance can be very expensive, both in terms of cost and time.

Of specific concern is the use of flexible hosing in the food industry to move liquid and particulate matter. For many applications, it is simply impractical to use solid piping. Thus, flexible hosing, which has a limited useful life span due to cracks and tears, is used extensively in the food industry. This hosing most often be attached to a wide variety of different types of equipment, such as solid piping, mixers, holding tanks, pasteurizers, packaging equipment and the like. The means by which the flexible hosing is attached to these devices differs widely in the prior art.

For example, flexible hoses can be attached to a solid pipeline using a stainless steel fitting having a welded ferrule. The fitting is mated with the flexible hosing and the two are urged into tight contact using metal strapping. This approach, however, often results in the development of bubbles or wrinkles at the point where the flexible hose and the fitting mate. These bubbles and wrinkles provide areas where bacterial growth can occur. Thus, the presence of such bubbles or wrinkles renders the flexible hosing unacceptable according to many U.S. dairy industry standards. When such a bubble is discovered, the flexible hose must be repaired or replaced immediately.

Other types of couplings have also be used, albeit with limited success. In one type of coupling, a sleeve is placed around the outer diameter of the flexible hose and a stem is inserted into the inner diameter of the flexible hose. A mandrel is then forced into the stem, thereby expanding the stem and pinching the hose between the stem and the sleeve. While the results can be satisfactory, the mandrel often leaves internal marks on the stem. Also, if he force exerted on mandrel is too great, the hose wall can be damaged, thereby shortening the useful lifetime of the hose.

A problem common to all conventional couplers is their lack of adaptablility. For example, in time-sensitive manufacturing processes, such as cheesemaking, hoses must be changed often. Currently available hose couplers, however, are cumbersome and make it difficult and sometimes impossible to change to a different type of hose or hose size without using a different type of coupler entirely. This results in higher inventory costs (because more and different types of couplers are required) and lost productivity on the work floor.

The present invention addresses the shortcomings of prior couplers by providing a flexible hose coupler comprising a minimum of parts. The coupler is easily installed and removed with little or no damage to the flexible hosing. The coupler also complies with all current federal regulations relating to sanitary hose couplings for use in the food industry.

SUMMARY OF THE INVENTION

A first embodiment of the invention is directed to a hose coupler comprising a hollow stem having a first end and a second end. Each of the first and second ends of the stem has an outer diameter. The outer diameter of the first end of the stem is dimensioned and configured to fit within an inner diameter of a flexible hose. The second end of the stem protrudes from the end of the hose when the first end of the stem is disposed within the inner diameter of the hose. (The hose itself is not part of the invention.) The first embodiment further includes a compression sleeve comprising at least two sub-parts, the sub-parts cooperating to define a hollow structure having an inner diameter, an outer diameter, and first end, and a second end. The inner diameter at the first end of the compression sleeve is dimensioned and configured to abut an outer diameter of the hose, and the inner diameter at the second end of the compression sleeve is dimensioned and configured to abut the outer diameter of the second end of the stem when the first end of the stem is inserted into the end of the hose. A collar is also included, the collar having an inner diameter and an outer diameter. The inner diameter of the collar is dimensioned and configured to abut the outer diameter of the compression sleeve, the collar being disposed about the outer diameter of the compression sleeve. In this fashion, when the collar is disposed about the compression sleeve, the collar urges the inner diameter of the compression sleeve against the outer diameter of the hose, thereby urging the inner diameter of the hose against the outer diameter of the first end of the stem, and thereby reversibly attaching the stem to the end of the hose.

A second embodiment of the invention is a hose coupler as described in the immediately preceding paragraph, wherein the coupler further comprises a first shoulder disposed about the outer diameter of the stem at a point where the stem exits the end of the hose when the first end of the stem is inserted into the hose; and a second shoulder disposed about the outer diameter of the stem at a point closer to the second end of the stem from the first shoulder, thereby defining a gap between the first shoulder and the second shoulder. In this embodiment, the inner diameter at the first end of the compression sleeve is dimensioned and configured to abut an outer diameter of the hose, and the inner diameter at the second end of the compression sleeve is dimensioned and configured to encircle the first shoulder and to abut the second shoulder.

A third embodiment of the invention is directed to a hose coupler as described in the preceding paragraph, wherein the coupler further comprises external threading or barbs disposed on the outer diameter of the first end of the stem and internal threading or barbs disposed on the inner diameter of the first end of the compression sleeve. The third embodiment of the invention also includes a circumferential depression disposed in the outer diameter of the compression sleeve and a corresponding flange disposed in the inner diameter of the collar. The flange and the depression are disposed in such a fashion that the flange in the collar engages the depression in the compression sleeve when the collar is disposed about the compression sleeve.

The present invention has many advantages over known hose couplers, the primary advantages being ease of use and ease of cleaning the coupler to comply with applicable cleanliness standards in the food and pharmaceutical industries.

BRIEF DESCRIPTION OF THE DRAWINGS

FIG. 4A is an axial cross-sectional view of the combined split compression sleeves 18 and 18'.

FIG. 4B is an isolated transverse cross-sectional view of the combined split compression sleeves 18 and 18', showing internal threading 19.

DETAILED DESCRIPTION OF THE INVENTION

Figure 1:
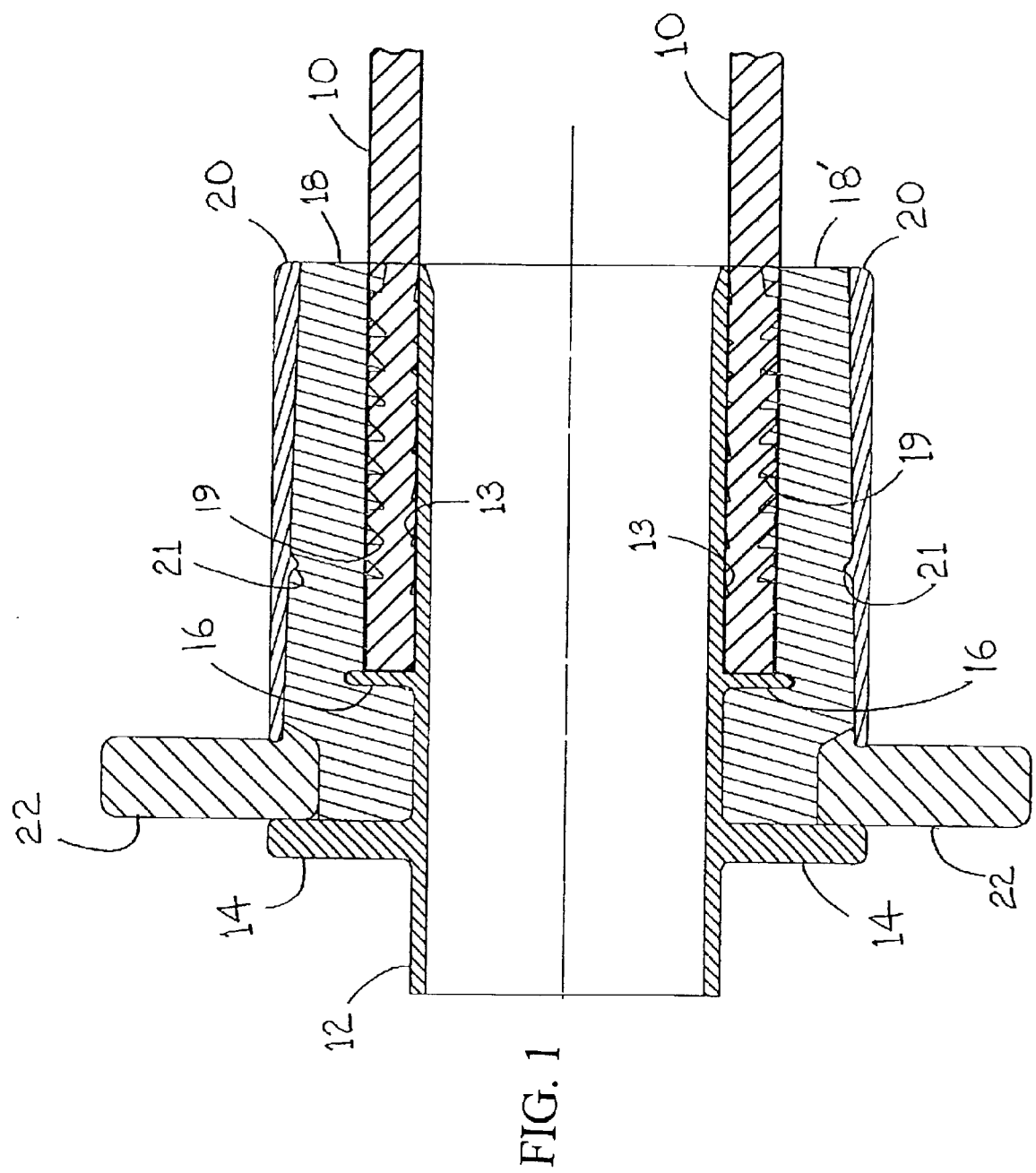
FIG. 1 is a transverse cross-sectional view of the preferred embodiment of the hose coupler according to the present invention.
Figure 3:
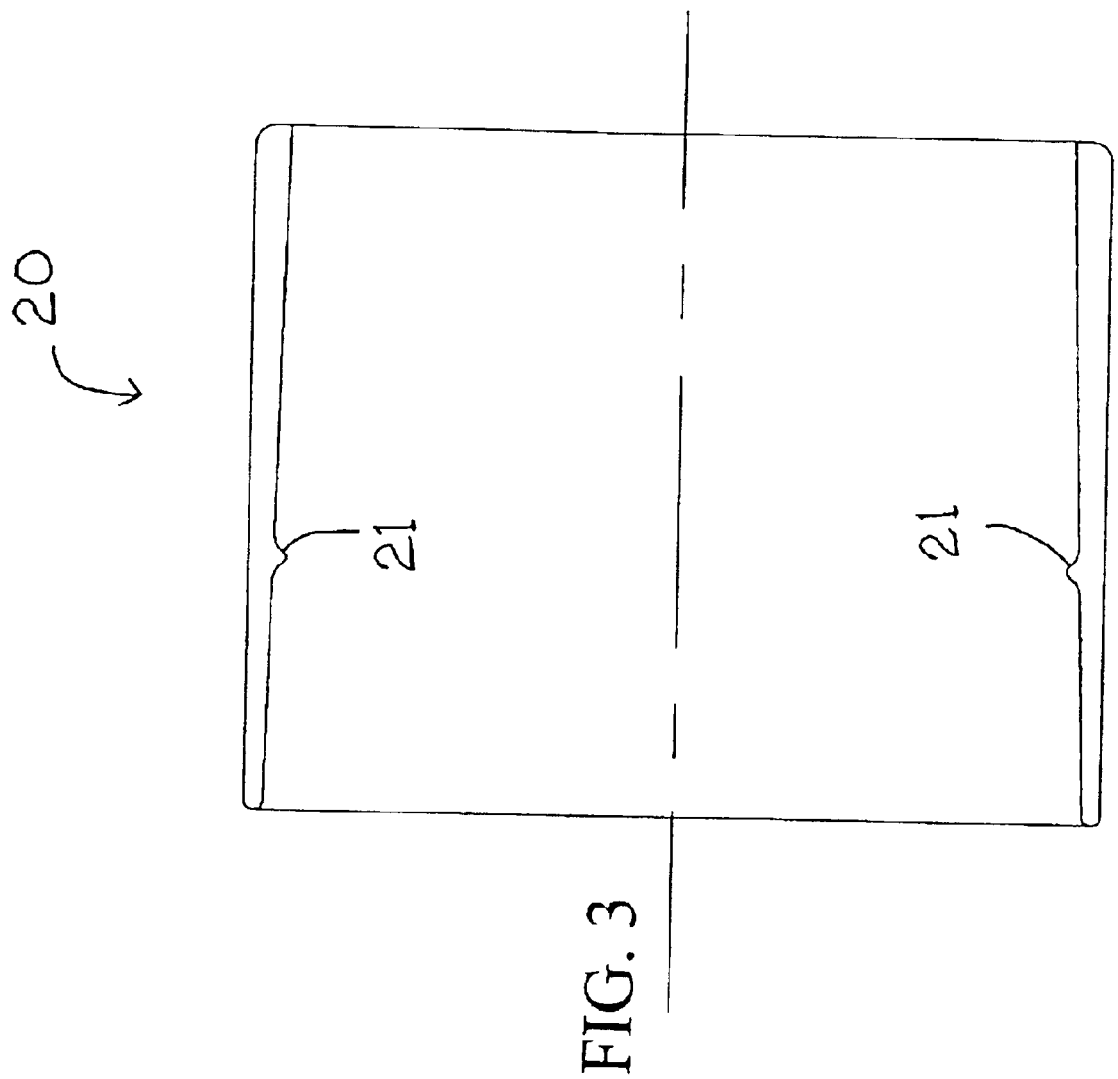
FIG. 3 is an isolated transverse cross-sectional view of the collar 20 for use in the present invention.

Referring now to the drawing figures, where the same reference numbers are used for the same features throughout all of the drawings, FIG. 1 shows a transverse cross-sectional view of the preferred embodiment of the hose coupler according to the present invention. The coupler is designed to work in conjunction with hose 10. The hose itself forms no part of the claimed invention. The coupler includes collar 20, the collar having an internal, circumferential locking flange 21 (see FIG. 3); stem 12; and split compression sleeves 18 and 18'.

Figure 2:
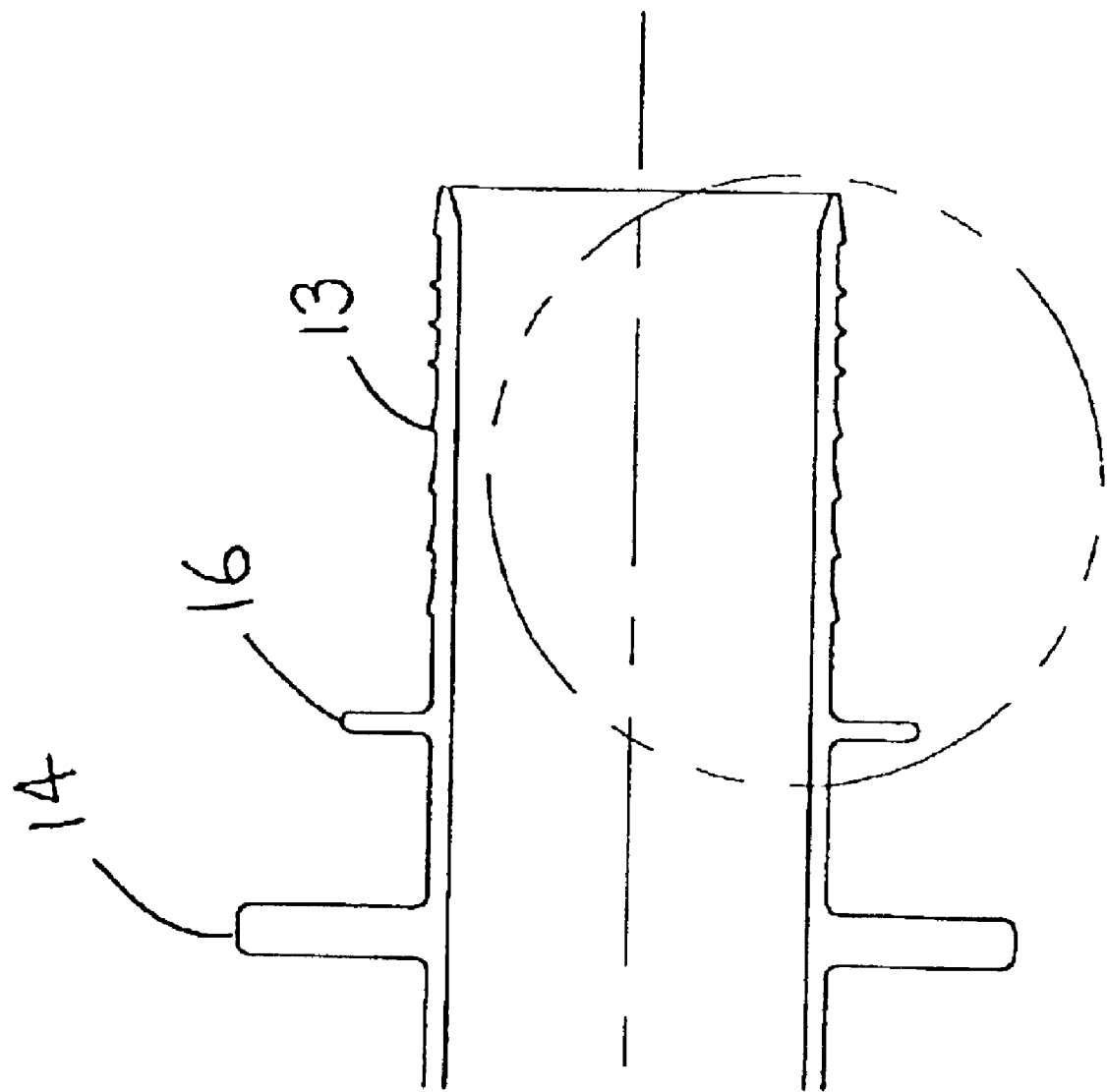
FIG. 2 is an isolated transverse cross-sectional view of the stem 12 for use in the present invention.

The stem 12, shown in isolation in FIG. 2, includes shoulders 14 and 16, as well as external threading, teeth, or barbs 13 (preferably contiguous). The portion of the stem with the external teeth 13 is dimensioned and configured with an outer diameter substantially complementary to the inner diameter of the hose 10 into which the stem is placed (see FIG. 1). Flange 16 is provided on the stem to abut the end of the hose. The flange 16 also acts as a link or collar to maintain the connection between the stem 12, hose 10, and split compression sleeves 18 and 18'.

Split compression sleeves 18 and 18' (see FIGS. 4A and 4B) are disposed about hose 10 and stem 12. The compression sleeves cooperatively encircle the end of the hose and stem. As shown in FIG. 4A, there are two sections 18 and 18' that cooperatively form a complete split compression sleeve unit. A small gap 24 between the two sections allows them to be compressed toward one another, thereby compressing the hose 10 between the sections of the compression sleeves 18 and 18' and the stem 12. Alternatively, the complete split compression sleeve unit can be divided into more than two sections, to accommodate hoses of different inside and outside diameters. For example, the complete split compression sleeve unit can be comprised of three, four, or even more sections, each akin to sections 18 and 18', and together cooperatively engaging to define the complete split compression sleeve unit.

The compression sleeves 18 and 18' include internal threading or teeth 19. Each of 18 and 18' are dimensioned and configured to have an inner diameter that will fit snugly about the outer diameter of hose 10 and stem 12. The compression sleeves also includes an external circumferential depression 21' dimensioned and configured to engage the flange 21 on the collar 20. As the collar is placed over the split compression sleeves, the hose is compressed between the outer diameter of the stem and the inner diameter of the split compression sleeves. The pressure of the collar forces the split compression sleeves toward one another. As the sections of the split compression sleeves are forced toward one another, the gaps between them are filled with the outer surface of the hose, thereby sealing the gaps 24.

Lastly, a rubber bumper 22 is provided to protect the coupler during rough use and to act as a seal to meet sanitary requirements. The bumper 22 is fabricated of a suitable flexible material, such as synthetic rubber, and is dimensioned and configured to fit snugly in the space between shoulder 14 and the proximal end of the collar 20.

In operation, the coupler is used as follows: first, the collar 20 is placed around the hose 10 and positioned at a point removed from the end of the hose. The stem 12 is then inserted into the end of the hose so that the hose end abuts flange 16. Split compression sleeves 18 and 18' are then positioned about the hose 10 and stem 12 such that a portion of the combined split compression sleeves contacts the outer diameter of the hose, while another portion of the combined split compression sleeves abuts the area of the stem 12 between flanges 16 and 14. At this point, the bumper 22 is installed to help hold the split compression sleeves together during assembly. (Once fully assembled, the bumper will then serve its dual role of bumper and seal.) The collar 20 is then urged against the combined split compression sleeves, thereby engaging flange 21 of the collar within the depression 21' of the split compression sleeves, in the process thereby securely fixing the hose 10 between the stem 12 and the split compression sleeves 18 and 18'.

What is claimed is:

1. A hose coupler comprising:
   a hollow stem having a first end and a second end, each of the first and second ends having an outer diameter, wherein the outer diameter of the first end of the stem is dimensioned and configured to fit within an inner diameter of a flexible hose, and the second end of the stem protrudes from an end of the hose when the first end of the stem is disposed within the inner diameter of the hose;
   a compression sleeve comprising at least two sub-parts, the sub-parts cooperating to define a hollow structure having an inner diameter, an outer diameter, a first end, and a second end, wherein the inner diameter at the first end of the compression sleeve is dimensioned and configured to abut an outer diameter of the hose, and the inner diameter at the second end of the compression sleeve is dimensioned and configured to abut the outer diameter of the second end of the stem when the first end of the stem is inserted into the end of the hose;

a collar having an inner diameter and an outer diameter, the inner diameter of the collar being dimensioned and configured to abut the outer diameter of the compression sleeve, the collar being disposed about the outer diameter of the compression sleeve; and a circumferential depression disposed in the outer diameter of the compression sleeve and a corresponding flange disposed in the inner diameter of the collar, such that the flange in the collar engages the depression in the compression sleeve when the collar is disposed about the compression sleeve;

wherein when the collar is disposed about the compression sleeve, the collar urges the inner diameter of the first end of the compression sleeve against the outer diameter of the hose and urges the inner diameter of the second end of the compression sleeve against the outer diameter of the second end of the stem, thereby urging the inner diameter of the hose against the outer diameter of the first end of the stem, thereby reversibly attaching the stem to the end of the hose.

2. A hose coupler comprising:

a hollow stem having a first end and a second end, each of the first and second ends having an outer diameter, wherein the outer diameter of the first end of the stem is dimensioned and configured to fit within an inner diameter of a flexible hose, and the second end of the stem protrudes from an end of the hose when the first end of the stem is disposed within the inner diameter of the hose;

a compression sleeve comprising at least two sub-parts, the sub-pans cooperating to define a hollow structure having an inner diameter, an outer diameter, a first end, and a second end, wherein the inner diameter at the first end of the compression sleeve is dimensioned and configured to abut an outer diameter of the hose, and the inner diameter at the second end of the compression sleeve is dimensioned and configured to abut the outer diameter of the second end of the stem when the first end of the stem is inserted into the end of the hose;

a collar having an inner diameter and an outer diameter, the inner diameter of the collar being dimensioned and configured to abut the outer diameter of the compression sleeve, the collar being disposed about the outer diameter of the compression sleeve;

a first shoulder disposed about the outer diameter of the stem at a point where the stem exits the end of the hose when the first end of the stem is inserted into a hose;

a second shoulder disposed about the outer diameter of the stem at a point closer to the second end of the stem from the first shoulder, thereby defining a gap between the first shoulder and the second shoulder; and a bumper disposed within the gap;

wherein when the collar is disposed about the compression sleeve, the collar urges the inner diameter of the first end of the compression sleeve against the outer diameter of the hose and urges the inner diameter of the second end of the compression sleeve against the outer diameter of the second end of the stem, thereby urging the inner diameter of the hose against the outer diameter of the first end of the stem, thereby reversibly attaching the stem to the end of the hose.

3. A hose coupler comprising:

a hollow stem having a first end and a second end, each of the first and second ends having an outer diameter, wherein the outer diameter of the first end of the stem is dimensioned and configured to fit within an inner diameter of a flexible hose, and the second end of the stem protrudes from an end of the hose when the first end of the stem is disposed within the inner diameter of the hose;

a first shoulder disposed about the outer diameter of the stem at a point where the stem exits the end of the hose when the first end of the stem is inserted into the hose;

a second shoulder disposed about the outer diameter of the stem at a point closer to the second end of the stem from the first shoulder, thereby defining a gap between the first shoulder and the second shoulder;

a compression sleeve comprising at least two sub-parts, the sub-parts cooperating to define a hollow structure having an inner diameter, an outer diameter, a first end, and a second end, wherein the inner diameter at the first end of the compression sleeve is dimensioned and configured to abut an outer diameter of the hose, and the inner diameter at the second end of the compression sleeve is dimensioned and configured to encircle the first shoulder and abut the second shoulder;

a collar having an inner diameter and an outer diameter, the inner diameter of the collar being dimensioned and configured to abut the outer diameter of the compression sleeve, the collar being disposed about the outer diameter of the compression sleeve; and a circumferential depression disposed in the outer diameter of the compression sleeve and a corresponding flange disposed in the inner diameter of the collar, such that the flange in the collar engages the depression in the compression sleeve when the collar is disposed about the compression sleeve;

wherein when the collar is disposed about the compression sleeve, the collar urges the inner diameter of the first end of the compression sleeve against the outer diameter of the hose and urges the inner diameter of the second end of the compression sleeve against the second end of the stem, thereby urging the inner diameter of the hose against the outer diameter of the first end of the stem, thereby reversibly attaching the stem to the end of the hose.

4. The hose coupler of claim 3, wherein when the flange in the collar engages the depression in the compression sleeve, a circumferential gap is defined between the collar and the second shoulder, and further comprising a bumper disposed in the gap.

5. A hose coupler comprising:

a hollow stem having a first end and a second end, each of the first and second ends having an outer diameter, wherein the outer diameter of the first end of the stem is dimensioned and configured to fit within an inner diameter of a flexible hose, and the second end of the stem protrudes from an end of the hose when the first end of the stem is disposed within the inner diameter of the hose;

external threading or barbs disposed on the outer diameter of the first end of the stem;

a first shoulder disposed about the outer diameter of the stem at a point where the stem exits the end of the hose when the first end of the stem is inserted into the hose;

a second shoulder disposed about the outer diameter of the stem at a point closer to the second end of the stem from the first shoulder, thereby defining a gap between the first shoulder and the second shoulder;

a compression sleeve comprising at least two sub-parts, the sub-parts cooperating to define a hollow structure having an inner diameter, an outer diameter, a first end, and a second end, wherein the inner diameter at the first end of the compression sleeve is dimensioned and configured to abut an outer diameter of the hose, and the inner diameter at the second end of the compression sleeve is dimensioned and configured to encircle the first shoulder and abut the second shoulder;

internal threading or barbs disposed on the inner diameter of the first end of the compression sleeve;

a collar having an inner diameter and an outer diameter, the inner diameter of the collar being dimensioned and configured to abut the outer diameter of the compression sleeve, the collar being disposed about the outer diameter of the compression sleeve;

a circumferential depression disposed in the outer diameter of the compression sleeve and a corresponding flange disposed in the inner diameter of the collar, such that the flange in the collar engages the depression in the compression sleeve when the collar is disposed about the compression sleeve; and wherein when the collar is disposed about the compression sleeve, the collar urges the inner diameter of the first end of the compression sleeve against the outer diameter of the hose and urges the inner diameter of the second end of the compression sleeve about the first shoulder and abutting the second shoulder of the stem, thereby urging the inner diameter of the hose against the outer diameter of the first end of the stem, thereby reversibly attaching the stem to the end of the hose.

6. The hose coupler of claim 5, wherein when the flange in the collar engages the depression in the compression sleeve, a circumferential gap is defined between the collar and the second shoulder, and further comprising a bumper disposed in the gap.

* * * * *